United States Patent
Uno (10) Patent No.: US 11,079,741 B2
(45) Date of Patent: *Aug. 3, 2021

(54) NUMERICAL CONTROLLER

(71) Applicant: Fanuc Corporation, Yamanashi (JP)

(72) Inventor: Kousuke Uno, Yamanshi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,196

(22) Filed: Feb. 19, 2019

(65) Prior Publication Data

US 2019/0265680 A1  Aug. 29, 2019

(30) Foreign Application Priority Data

Feb. 27, 2018  (JP) ............................. JP2018-033780

(51) Int. Cl.
G05B 19/4155  (2006.01)

(52) U.S. Cl.
CPC .................. *G05B 19/4155* (2013.01); *G05B 2219/35519* (2013.01)

(58) Field of Classification Search
CPC ...... G05B 19/4155; G05B 2219/35519; G05B 19/4065; G05B 19/408; G05B 2219/45136
USPC ........................................................ 700/159
See application file for complete search history.

(56) References Cited

U.S. PATENT DOCUMENTS

| | | | | |
|---|---|---|---|---|
| 2006/0142893 A1* | 6/2006 | Yasugi | ............... | G05B 19/4065 700/174 |
| 2010/0235145 A1* | 9/2010 | Ascari | ................... | B25J 9/1612 702/190 |
| 2012/0101624 A1* | 4/2012 | Ueno | ................... | B23Q 17/0976 700/173 |
| 2013/0238619 A1* | 9/2013 | Hanaoka | ............. | G06F 16/2477 707/736 |
| 2014/0180467 A1* | 6/2014 | Sato | ...................... | G05B 19/18 700/184 |
| 2015/0127139 A1* | 5/2015 | Bolin | ................. | G05B 19/4065 700/173 |
| 2015/0160098 A1* | 6/2015 | Noda | .................... | G05B 23/024 702/35 |
| 2016/0349737 A1* | 12/2016 | Yen | ..................... | G05B 19/4065 |
| 2017/0153629 A1 | 6/2017 | Oonishi | | |
| 2017/0227945 A1* | 8/2017 | Wang | ................. | G05B 19/4069 |

FOREIGN PATENT DOCUMENTS

| | | | | |
|---|---|---|---|---|
| DE | 102014100095 A1 | * | 7/2015 | .......... G05B 19/401 |
| JP | 2017-097701 A | | 6/2017 | |
| JP | 2017209743 A | | 11/2017 | |

OTHER PUBLICATIONS

Notice of Reasons for Refusal for Japanese Application No. 2018-033780, dated Feb. 25, 2020, with translation, 6 pages.

* cited by examiner

*Primary Examiner* — Md Azad (74) *Attorney, Agent, or Firm* — RatnerPrestia (57) ABSTRACT

A numerical controller outputs a feature amount of time-series data generated in relation to machining. The numerical controller is provided with a data acquisition unit configured to acquire the time-series data from a sensor, a feature amount calculation unit configured to sort the time-series data by their values, extract a set of the time-series data with variations of the values not higher than a predetermined threshold, and calculate the feature amount representative of the set, and a feature amount output unit configured to output the feature amount.

4 Claims, 9 Drawing Sheets

FIG.9

NUMERICAL CONTROLLER

CROSS-REFERENCE TO RELATED APPLICATION

This application is a new U.S. Patent Application that claims benefit of Japanese Patent Application No. 2018-033780, filed Feb. 27, 2018 the disclosure of this application is being incorporated herein by reference in its entirety for all purposes.

BACKGROUND OF THE INVENTION

Field of the Invention

The present invention relates to a numerical controller, and more particularly, to a numerical controller configured to acquire a feature amount from data related to machining.

Description of the Related Art

Figure 1:
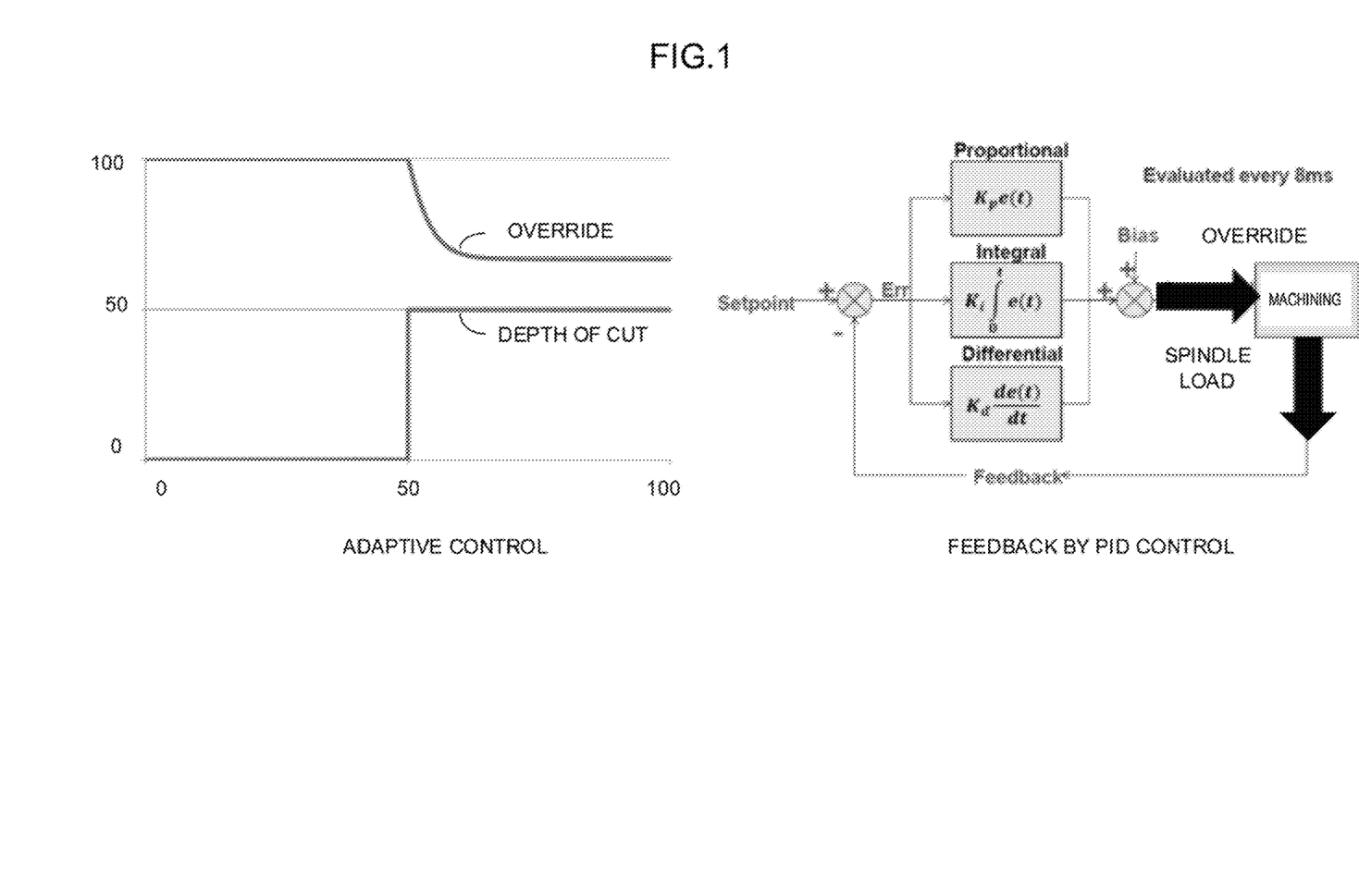
FIG. 1 is a diagram showing various kinds of control that can be performed by a numerical controller.

A numerical controller can acquire data generated in relation to machining from a sensor or the like and perform various kinds of control based on the acquired data. There is a numerical controller that detects a spindle load and controls the feed rate so that the spindle load is constant, mainly in order to reduce the cycle time in rough machining or extend the tool life, for example. Such control is called adaptive control and there is PID control as a method of feedback control that implements the adaptive control (FIG. 1).

Japanese Patent Application Laid-Open No. 2017-097701 describes a numerical controller that performs the PID control for controlling the moving speed of a spindle so as to fix the spindle load value.

In order to perform such control, it is necessary to determine a target value for the spindle load or the like depending on the machining conditions. For example, an experienced engineer used to set the target value by reading the load on a part subjected to stable machining with reference to a graph plotting variations of the spindle load during machining. Thus, the target value is conventionally determined based on experiences or know-hows and involves a problem of requiring much time and labor. Accordingly, there is a demand for a method for easily properly acquiring the features of data (e.g., spindle load) generated in relation to machining.

SUMMARY OF THE INVENTION

The present invention has been made to solve the above problem and has an object to provide a numerical controller configured to acquire a feature amount from data related to machining.

One form of a numerical controller according to the present invention is configured to output a feature amount of time-series data generated in relation to machining and comprises a data acquisition unit configured to acquire the time-series data from a sensor, a feature amount calculation unit configured to sort the time-series data by values thereof, extract a set of the time-series data with variations of the values not higher than a predetermined threshold, and calculate the feature amount representative of the set, and a feature amount output unit configured to output the feature amount.

Another form of the numerical controller according to the present invention is configured to output a feature amount of time-series data generated in relation to machining and comprises a data acquisition unit configured to acquire the time-series data from a sensor, a feature amount calculation unit configured to count a frequency of occurrence of a value of the time-series data, extract a set of the time-series data with the frequency of occurrence not lower than a predetermined threshold, and calculate the feature amount representative of the set, and a feature amount output unit configured to output the feature amount.

The numerical controller may further comprise a spindle control unit for controlling a feed rate based on a spindle load. The spindle control unit controls the feed rate with the feature amount output by the feature amount output unit set as a target value.

According to the present invention, there can be provided a numerical controller configured to acquire a feature amount from data related to machining.

DETAILED DESCRIPTION OF THE PREFERRED EMBODIMENTS

The following is a description of a configuration of a numerical controller 1 according to an embodiment of the present invention.

Figure 2:
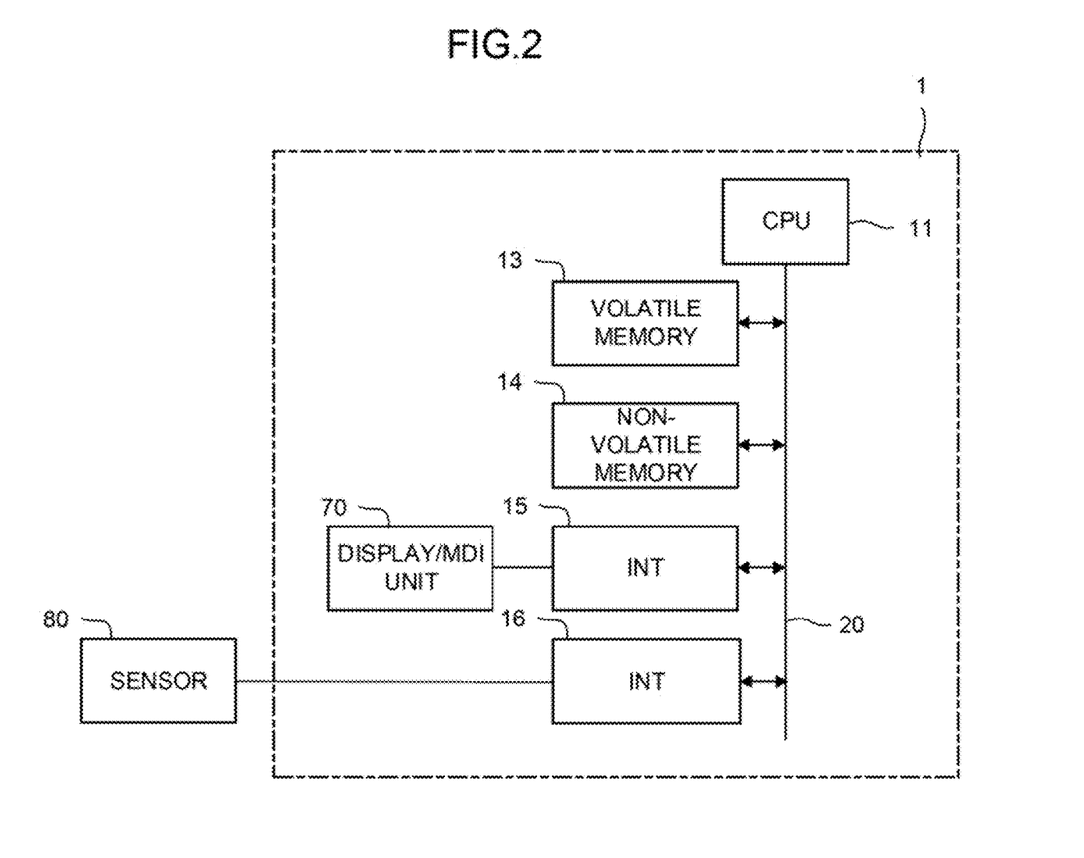
FIG. 2 is a hardware configuration diagram of a numerical controller according to one embodiment of the present invention.

FIG. 2 is a schematic hardware configuration diagram of principal parts of the numerical controller 1 according the embodiment of the present invention.

A CPU 11 of the numerical controller 1 is a processor for generally controlling the numerical controller 1 and reads out a program stored in a non-volatile memory 14 through a bus 20 and controls the entire numerical controller 1 according to the program.

The non-volatile memory 14 is constructed, for example, as a memory that is backed up by a battery (not shown) so that its storage state can be maintained even when the numerical controller 1 is powered off, for example. Programs and data stored in the non-volatile memory 14 may be developed in a volatile memory 13 during use. The volatile memory 13 is loaded with temporary calculation data and display data, data input through an input device, and the like, as well as the programs and data developed from the non-volatile memory 14.

A display/MDI unit 70 is a data input/output device equipped with a display, keyboard, and the like. Commands and data input from the keyboard of the display/MDI unit 70 are delivered to the CPU 11 through an interface 15. Moreover, display data output from the CPU 11 is displayed on the display of the display/MDI unit 70 through the interface 15.

A sensor 80 is a device configured to output various time-series data generated with the progress of machining. This device includes, for example, a motor or the like that can output a value of load or temperature, as well as a temperature sensor or a speed sensor externally attached to a machine tool. The data output from the sensor 80 are delivered to the CPU 11 through the interface 16.

Embodiment 1

The following is a description of a configuration example of the numerical controller 1 as Embodiment 1 of the present invention.

Figure 3:
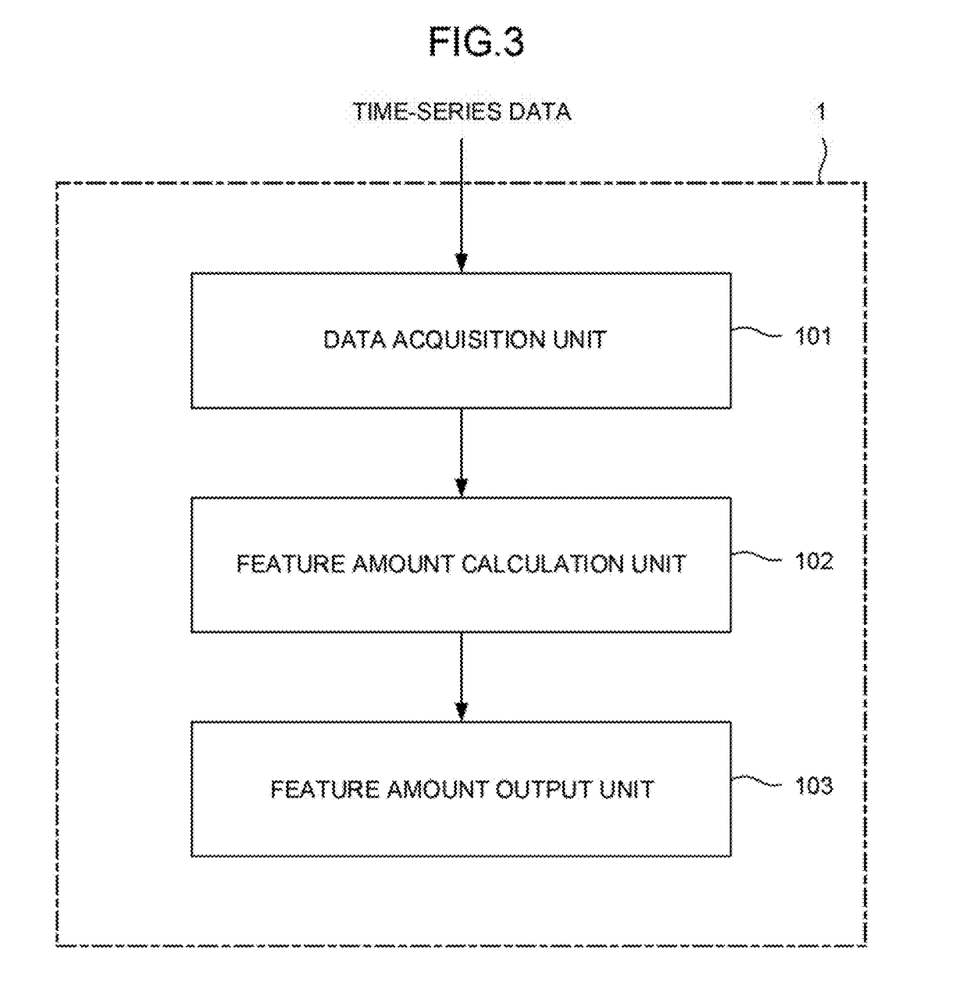
FIG. 3 is a block diagram showing a functional configuration of the numerical controller of FIG. 2.

FIG. 3 is a block diagram showing a schematic functional configuration of the numerical controller 1 according to Embodiment 1 of the present invention.

The numerical controller 1 comprises a data acquisition unit 101, feature amount calculation unit 102, and feature amount output unit 103.

Figure 4:
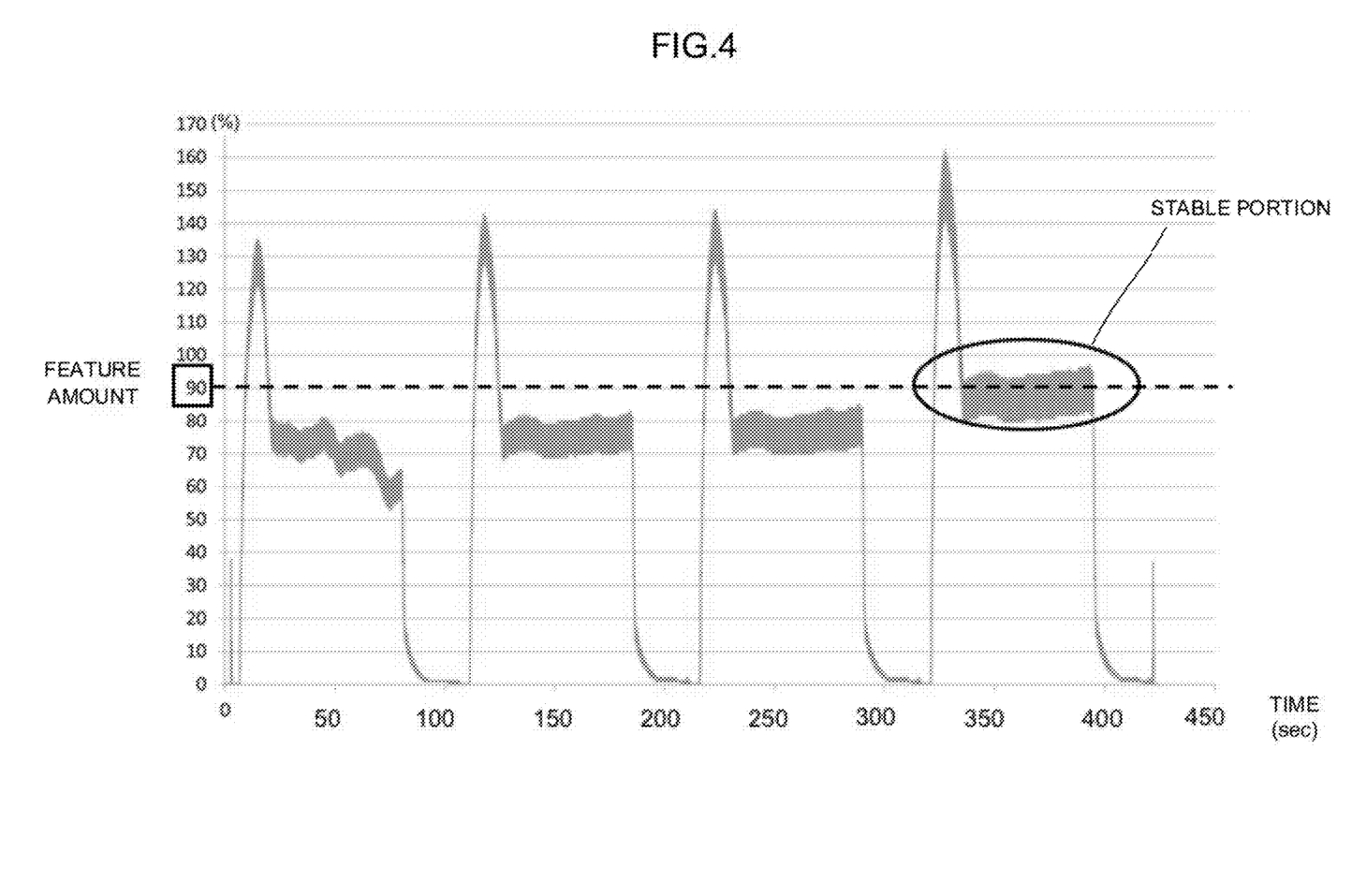
FIG. 4 is a diagram showing an example of time-series data.

The data acquisition unit 101 acquires the time-series data output by the sensor 80. FIG. 4 shows the waveform of a spindle load acquired as an example of the time-series data by the data acquisition unit 101. A dense portion (enclosed by an ellipse in FIG. 4) of the waveform is a portion that is machined stably. Conventionally, skilled engineers used to discover such stable portions from the time-series data, extract representative values (e.g., averages or medians) of the stable portions, and utilize them as target values for various kinds of control.

The feature amount calculation unit 102 sorts the time-series data acquired by the data acquisition unit 101 by the magnitude of their values, individually calculates differential values between the sorted data, and extracts data such that the calculated differential values meet certain conditions (typically, are not higher than a predetermined threshold). In this way, the values of those parts (hereinafter referred to as the feature amounts) in which the time-series data are stable can be extracted. Processing performed by the feature amount calculation unit 102 will now be described with reference to FIGS. 5, 6A and 6B.

Figure 5:
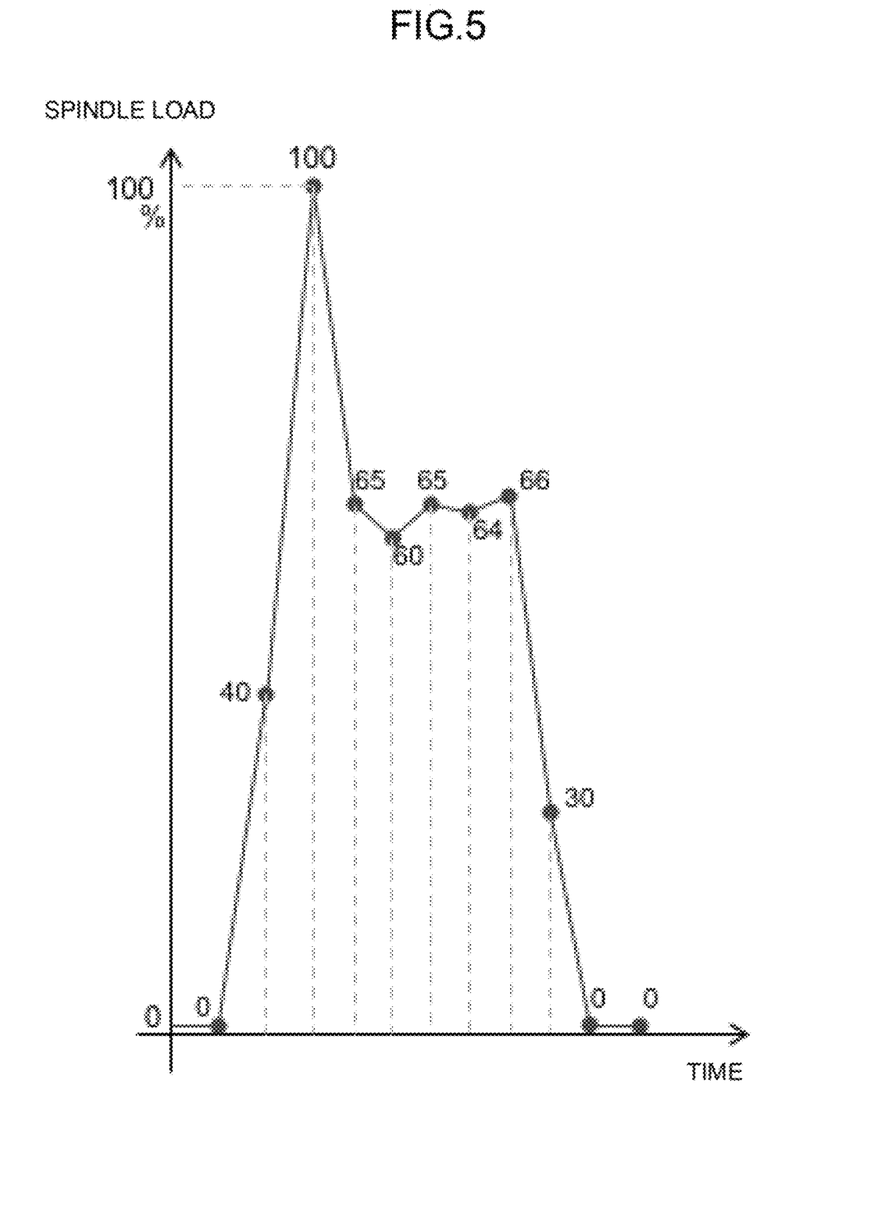
FIG. 5 is a diagram showing processing performed by a feature amount calculation unit.

FIG. 5 is a graph showing time-series data obtained before the sorting is performed by the feature amount calculation unit 102. In this graph, the ordinate and the abscissa represent the spindle load and time, respectively.

Figure 6A:
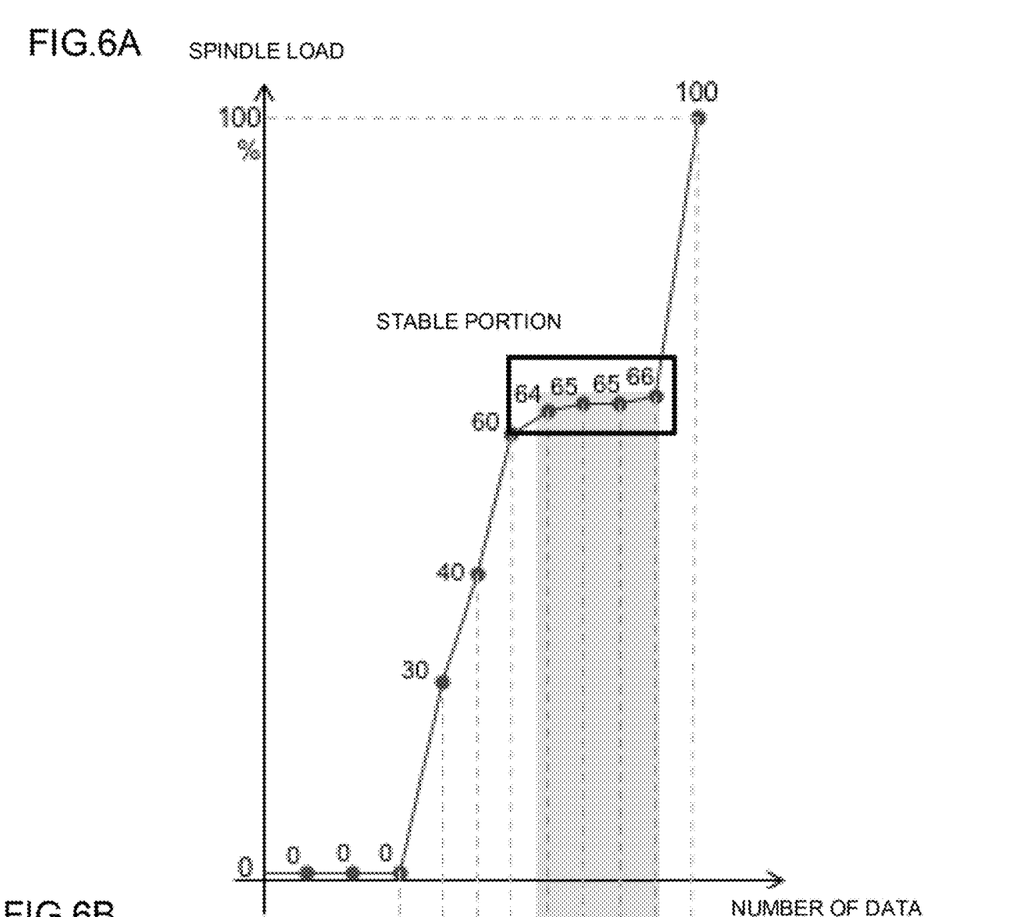
FIGS. 6A and 6B are diagrams showing processing performed by the feature amount calculation unit.

FIG. 6A is a graph showing time-series data obtained after the sorting is performed by the feature amount calculation unit 102. In this graph, the ordinate and the abscissa represent the spindle load and the cumulative value of the number of data, respectively. Data arranged in ascending order for the spindle load are successively arranged in the positive direction along the abscissa.

Figure 6B:
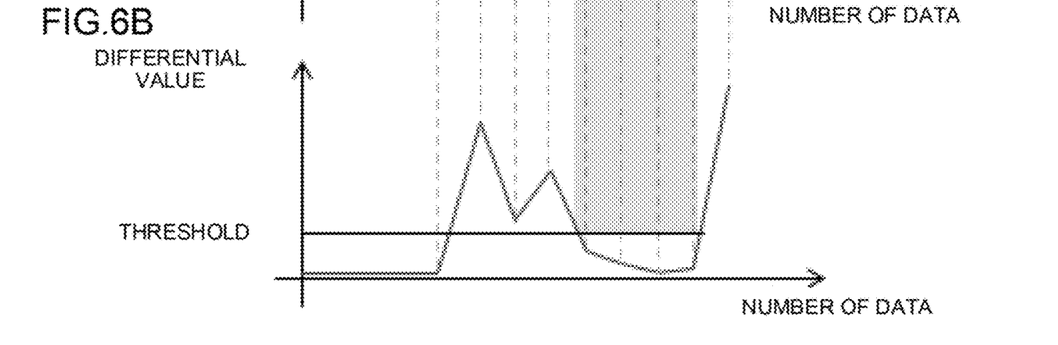

FIG. 6B is a graph plotting the differential values between the data, based on the time-series data after the sorting (FIG. 6A).

A comparison between FIGS. 6A and 6B indicates that the data intervals are dense in FIG. 6A when the differential values are lower than the predetermined threshold in FIG. 6B. Since this dense portion is a stable portion in other words, the feature amount calculation unit 102 extracts the features of the data belonging to this part as the feature amounts.

Figure 7:
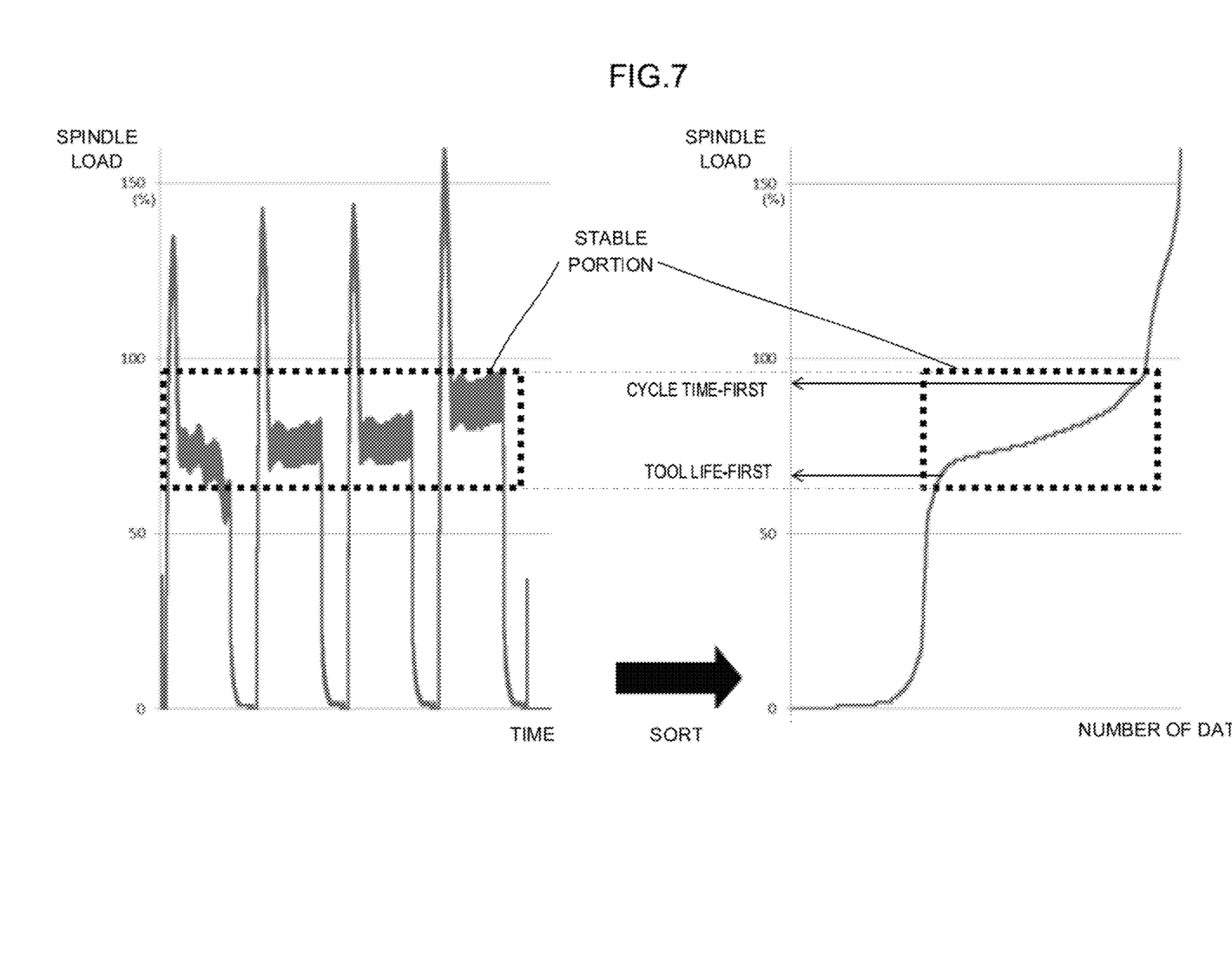
FIG. 7 is a diagram showing processing performed by the feature amount calculation unit.

The feature amount calculation unit 102 may be configured to calculate, as the feature amount, the average or median of those data such that the differential values are lower than the predetermined threshold, for example. Alternatively, as shown in FIG. 7, the feature amount calculation unit 102 may be configured to calculate, as the feature amounts, the upper limit value and/or the lower limit value of those data such that the differential values are lower than the predetermined threshold or values existing in a predetermined range from the upper limit value and/or the lower limit value. In this case, the feature amounts indicate, for example, the upper limit and/or the lower limit of a recommended range for the spindle load in which stable machining can be performed. The lower limit value (or a value within a predetermined range therefrom) can be said to be a recommended value for the spindle load in the case where the tool life is a priority. On the other hand, the upper limit value (or a value within a predetermined range therefrom) can be said to be a recommended value for the spindle load in the case where the cycle time is a priority.

If the feature amount calculation unit 102 sorts the time-series data, information on the temporal order relationship will be lost. Instead, a set of data such that the stable portions of the time-series data or the differential values are lower than a certain level and their change is slow can be extracted. For example, adaptive control of the spindle load is designed to suppress a high load, if any, and increase a low load, so that it is important to properly identify stable-load portions and use them as target values for the control. The feature amount calculation unit 102 can properly extract the stable portions for the spindle load or the like by the above-described processing and calculate the feature amounts that can be used as the target values.

The threshold used by the feature amount calculation unit 102 to identify the stable portions may be either previously given as a fixed value or obtained by an arbitrary method such as calculation. For example, the average as the result of the differentiation may be used as the threshold.

Figure 8:
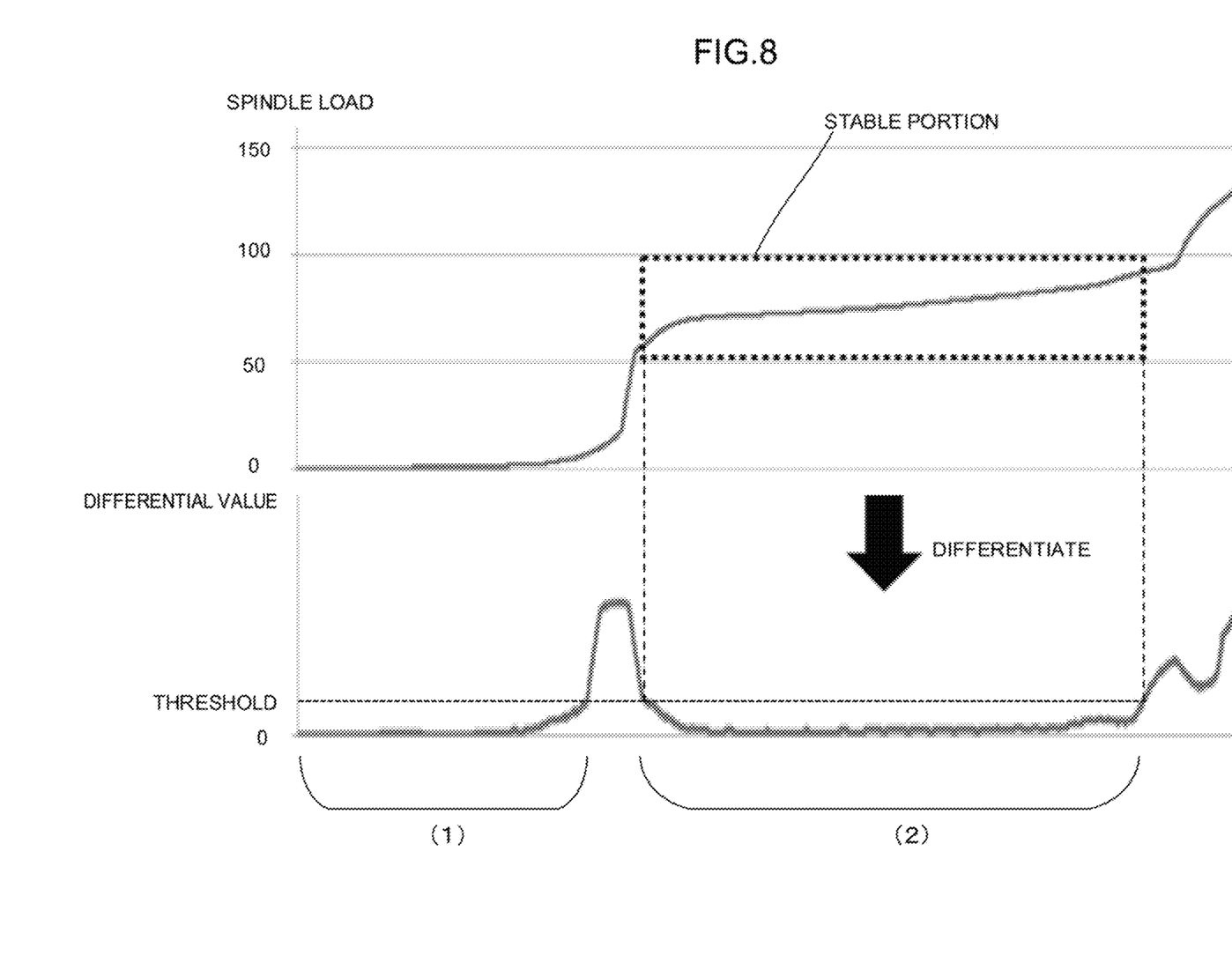
FIG. 8 is a diagram showing processing performed by the feature amount calculation unit.

In some cases, as shown in FIG. 8, there can be a plurality of ranges in which the differential values are lower than the threshold. In FIG. 8, the differential values are lower than the threshold for both Group (1) distributed near the spindle load of 0 and Group (2) distributed in a stable portion for the spindle load. It is to be understood that Group (2) is useful as the feature amounts, so that Group (1) must be excluded from the result of the extraction. Therefore, if a plurality of groups are extracted, for example, the feature amount calculation unit 102 can exclude, from the result of the extraction, the group for which representative value (such as minimum, maximum, or average value) of the data included in both groups are smaller. Alternatively, if a plurality of groups are extracted, the feature amount calculation unit 102 can exclude, from the result of the extraction, the group for which the representative value (such as minimum, maximum, or average value) of the data (such as the spindle load) included in both groups are smaller than a second predetermined threshold. Alternatively, moreover, the data acquisition unit 101 can also be configured to be able to acquire the time-series data only when the workpiece is actually touched by a tool, that is, only during the machining. If this is done, data that should be originally excluded can be prevented from being acquired. The actual engagement between the tool and the workpiece can be detected when the differential value of the spindle load is not lower than a certain level, for example.

The feature amount output unit 103 outputs the feature amounts calculated by the feature amount calculation unit 102. For example, the feature amount output unit 103 can display on a screen a feature amount, such as the average, median, upper limit value, or lower limit value of the data in the stable portion or a value existing in a predetermined range from the upper or lower limit value, calculated by the feature amount calculation unit 102. Alternatively, the feature amount can also be output directly to another function of the numerical controller 1, such as a processing unit configured to perform the adaptive control or PID control.

For example, feedback control of the spindle load is implemented by controlling the feed rate so as to bring the spindle load close to the target value. If the numerical controller 1 comprises a spindle control unit for performing such spindle load feedback control, the spindle control unit can control the feed rate with the feature amount output by the feature amount output unit 103 set as the target value for the spindle load. Thus, the feature amounts of the present invention can be used as target values for controlling numerical values related to commands that can be changed by disturbance.

According to the present embodiment, the numerical controller 1 can easily properly extract feature amounts from stable portions such that extremely high and low values, among the time-series data acquired in relation to the actual machining, are excluded. In this way, a technical expert is enabled to easily set target values suitable for desired control.

Moreover, in the present embodiment, the numerical controller 1 extracts the feature amounts after sorting the time-series data based on the magnitude of their values, so that it can output feature amounts in consideration of the upper and lower limits for the stable portion. Specifically, feature amounts with a range provided can be output. These are feature amounts particularly suitable for the control of industrial machines. Thus, the technical expert can set arbitrary target values depending on the purpose, within the range of the upper and lower limits for the stable portion. For example, a high or low spindle load can be selected within the range of the upper and lower limits for the stable portion in response to a demand for a reduction in cycle time or extension of the tool life.

Embodiment 2

Another implementation example of the numerical controller 1 will be described as Embodiment 2.

As shown in FIG. 3, the numerical controller 1 according to Embodiment 2 also comprises the data acquisition unit 101, feature amount calculation unit 102, and feature amount output unit 103. Embodiment 2 differs from Embodiment 1 in the processing of the feature amount calculation unit 102.

The feature amount calculation unit 102 according to Embodiment 2 counts the number of occurrences, that is, the frequency of occurrence, for each value or each range of the values, for the time-series data acquired by the data acquisition unit 101. Then, it extracts data such that the number of occurrences meets certain conditions (typically, is not lower than a predetermined threshold). Thus, processing is performed to extract the part or feature amount for which the time-series data are stable. The processing performed by the feature amount calculation unit 102 will now be described with reference to FIG. 9.

Figure 9:
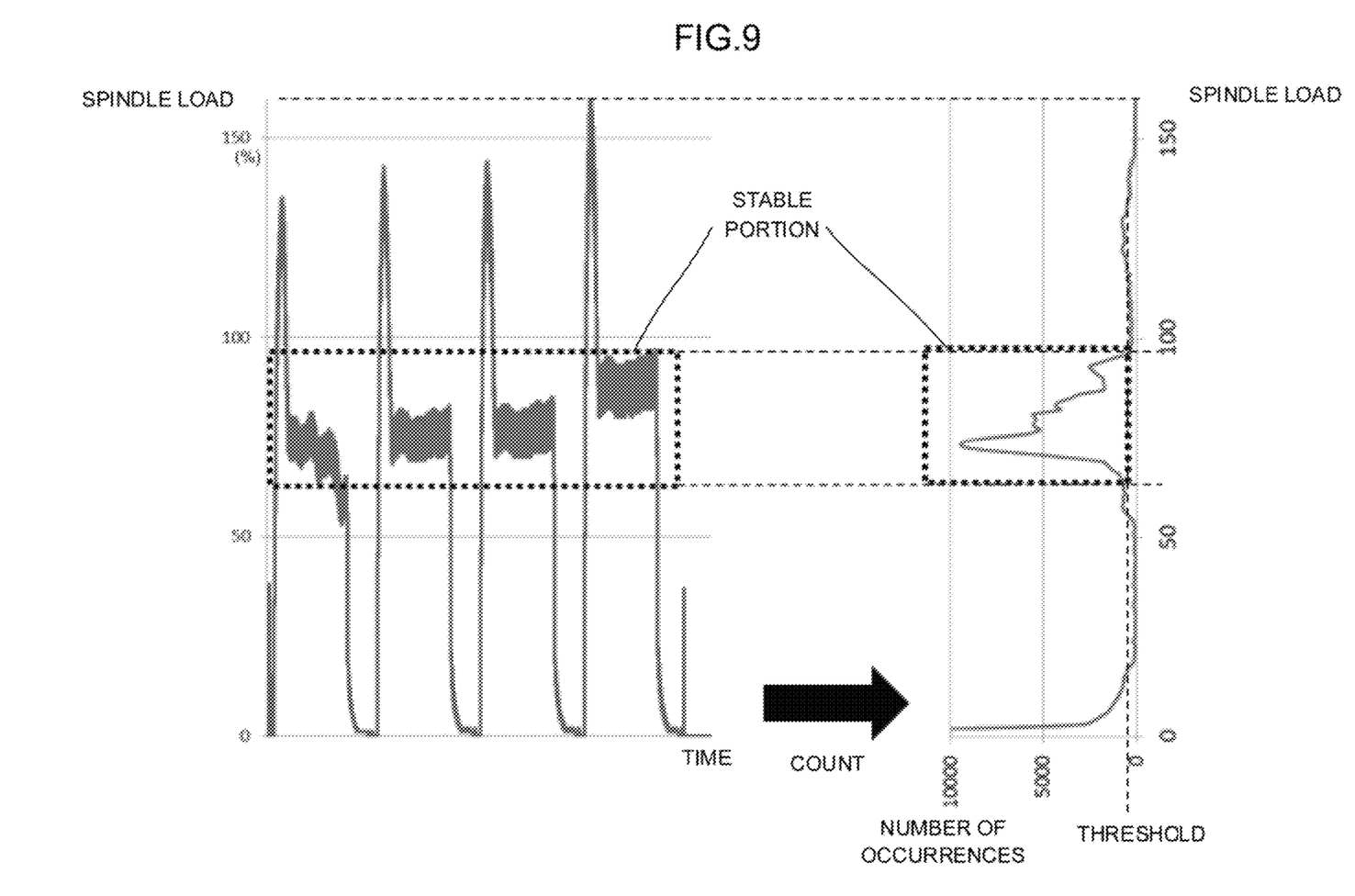
FIG. 9 is a diagram showing processing performed by the feature amount calculation unit.

The left-hand portion of FIG. 9 is a graph showing the time-series data acquired by the data acquisition unit 101. In this graph, the ordinate and the abscissa represent the spindle load and time, respectively. The right-hand portion of FIG. 9 is a graph showing the time-series data acquired after the counting is performed by the feature amount calculation unit 102. In this graph, the ordinate represents the spindle load, whereas the abscissa represents the count number, that is, the number of occurrences of the spindle load in the time-series data. Hereupon, the feature amount calculation unit 102 may also be configured to divide the values of the time-series data for each certain range as it count them. For example, the feature amount calculation unit 102 may be configured to group values of the spindle load obtained by sampling by 1% in each division so that the number of data belonging to each group can be counted. It can be seen that the data intervals are dense in the left-hand portion of FIG. 9 when the count number exceeds a predetermined threshold in the right-hand portion of FIG. 9. Since this dense portion is nothing but the stable portion, the feature amount calculation unit 102 extracts the characteristics of data that belong to these portions as the feature amounts. These feature amounts are extracted from the stable portion in the same method as that of Embodiment 1.

According to the present embodiment, the numerical controller 1 can calculate the feature amounts having the same features as those of Embodiment 1 based on a smaller calculation amount and less memory usage.

The present invention is not limited to the above-described embodiments and can be suitably modified and embodied in various forms. For example, in the above embodiments, the numerical controller 1 is configured to comprise the data acquisition unit 101, feature amount calculation unit 102, and feature amount output unit 103. However, the present invention is not limited to this, and a host device connected to one or more numerical controllers, for example, may be configured to comprise the data acquisition unit 101, feature amount calculation unit 102, and feature amount output unit 103. Specifically, sensor values output from the one or more numerical controllers are acquired by data acquisition unit 101 of the host device, and the feature amount calculation unit 102 and the feature amount output unit 103 perform calculation and output of the feature amounts by using the sensor values output from the one or more numerical controllers. The host device may be a computer such as a server located on a network or one of a plurality of numerical controllers connected to one another by the network.

Moreover, the calculation processing for the feature amounts of the spindle load is given as an application example of the present invention in the embodiment described above. However, the present invention is applicable to the extraction of feature amounts from various other time-series data. Furthermore, the feature amounts calculated in this manner can be used for various kinds of control other than the adaptive control or PID control. The following is a description of two practical application examples.

Application Example 1

In some cases, idling may be performed to warm up a machine tool before workpiece machining is started. The end of the idling can be determined on condition that the temperature of a cutting fluid, for example, is stabilized. The determination of fulfilment of this condition can be implemented by the application of the present invention.

The data acquisition unit 101 acquires time-series data on the cutting fluid temperature output by the sensor 80 serving as a temperature sensor. The feature amount calculation unit 102 identifies a stable portion of the time-series data acquired by the data acquisition unit 101 by the method described in connection with Embodiment 1 or 2. The feature amount calculation unit 102 extracts, for example, the average of temperature data contained in the stable portion as a feature amount. The feature amount output unit 103 outputs the feature amount to a determination unit (not shown). The numerical controller 1 repeats this series of processing steps at regular time intervals and outputs the feature amount for each certain time.

The determination unit receives the feature amount (average of the temperature data contained in the stable portion) output at regular time intervals from the feature amount output unit 103. It is determined that the idling should be terminated when it can be concluded that the time change of the feature amount is small enough, e.g., when the differential value of the feature amount is not higher than a predetermined threshold.

Application Example 2

With the progress of degradation of the tool, the stable portion of the spindle load gradually rises. The tool life can be estimated by observing the time change of the feature amount of the spindle load, focusing on this phenomenon.

The data acquisition unit 101 acquires time-series data on the spindle load output by the sensor 80. The feature amount calculation unit 102 identifies a stable portion of the time-series data acquired by the data acquisition unit 101 by the method described in connection with Embodiment 1 or 2. The feature amount calculation unit 102 extracts, for example, the average of the spindle load contained in the stable portion as a feature amount. The feature amount output unit 103 outputs the feature amount to a determination unit (not shown). The numerical controller 1 repeats this series of processing steps at regular time intervals and outputs the feature amount for each certain time.

The determination unit receives the feature amount (average of the spindle load contained in the stable portion) output at regular time intervals from the feature amount output unit 103. It is determined that the tool life is nearly exhausted when it can be concluded that the feature amount is increased beyond its limit, e.g., when the feature amount exceeds a predetermined threshold.

Application Example 3

The method of Application Example 2 is also applicable to the prediction of the life of some other means than a tool. For example, the stable portion of the cutting fluid temperature may possibly change with aging of a cutting fluid heater. Therefore, the time change of the feature amount of the cutting fluid temperature data can be used to predict the life of the cutting fluid heater.

The data acquisition unit 101 acquires time-series data on the cutting fluid temperature output by the sensor 80 as a temperature sensor. The feature amount calculation unit 102 identifies a stable portion of the time-series data acquired by the data acquisition unit 101 by the method described in connection with Embodiment 1 or 2. The feature amount calculation unit 102 extracts, for example, the average of temperature data contained in the stable portion as a feature amount. The feature amount output unit 103 outputs the feature amount to a determination unit (not shown). The numerical controller 1 repeats this series of processing steps for each period and outputs the feature amount for each certain period. The period described here, unlike that in Application Example 1, can be set for a long span based on, for example, a day unit.

The determination unit receives the feature amount (average of the temperature data contained in the stable portion) output at regular time intervals from the feature amount output unit 103. It is determined that the heater life is nearly exhausted when it can be concluded that the time change of the feature amount is larger than a certain value, e.g., when the differential value of the feature amount is not lower than a predetermined threshold.

The invention claimed is:

1. A numerical controller comprising:
   a processor configured to:
   control a spindle of a machine tool to machine a workpiece;
   acquire time-series data of spindle load from a sensor, the time-series data having an order according to a time in which the time-series data is output by the sensor;
   create a sorted time-series data by sorting the time-series data in increasing numerical order or decreasing numerical order according to respective magnitudes of numerical values of the time-series data;
   compute differential values between the magnitudes of adjacent data points in the sorted time-series data;
   extract a stable set of the sorted time-series data corresponding to the differential values less than a predetermined threshold;
   calculate a feature amount representative of the extracted stable set, the feature amount indicating a spindle load value; and
   output the feature amount for use in adjusting operation of the machine tool based on the calculated spindle load value.

2. The numerical controller according to claim 1, wherein the processor is further configured to control a feed rate based on a spindle load, and control the feed rate with the feature amount set as a target value.

3. A numerical controller comprising:
   a processor configured to:
   control a spindle of a machine tool to machine a workpiece;
   acquire time-series data of spindle load from a sensor;
   count a frequency of occurrence for each numerical value in the time-series data, the frequency of occurrence for each numerical value is a total number of occurrences for each numerical value in the time-series data;
   extract a set of the time-series data corresponding to the numerical values with the frequency of occurrence greater than a predetermined threshold;
   calculate a feature amount representative of the extracted set, the feature amount indicating a spindle load value; and
   output the feature amount for use in adjusting operation of the machine tool based on the calculated spindle load value.

4. The numerical controller according to claim 3, wherein the processor is further configured to control a feed rate based on a spindle load, and control the feed rate with the feature amount set as a target value.

* * * * *